United States Patent
Zollinger et al.

(10) Patent No.: US 8,532,290 B2
(45) Date of Patent: Sep. 10, 2013

(54) CONTENT PLAYBACK APIS USING ENCRYPTED STREAMS

(75) Inventors: James Mitch Zollinger, San Jose, CA (US); Yung-Hsiao Lai, Fremont, CA (US); Anthony Neal Park, San Jose, CA (US); David Randall Ronca, Campbell, CA (US); Scott Gregory Kelly, Santa Clara, CA (US)

(73) Assignee: Netflix, Inc., Los Gatos, CA (US)

( * ) Notice: Subject to any disclaimer, the term of this patent is extended or adjusted under 35 U.S.C. 154(b) by 96 days.

(21) Appl. No.: 13/041,303

(22) Filed: Mar. 4, 2011

(65) Prior Publication Data
US 2012/0226915 A1 Sep. 6, 2012

(51) Int. Cl.
*H04L 29/06* (2006.01)

(52) U.S. Cl.
USPC ............ 380/201; 713/193; 713/182; 713/189

(58) Field of Classification Search
USPC .......................................... 380/201; 713/193
See application file for complete search history.

(56) References Cited

U.S. PATENT DOCUMENTS

| | | | |
|---|---|---|---|
| 7,266,198 B2 * | 9/2007 | Medvinsky | 380/200 |
| 7,437,771 B2 * | 10/2008 | Alkove et al. | 726/29 |
| 7,484,103 B2 | 1/2009 | Woo et al. | |
| 2002/0083006 A1 * | 6/2002 | Headings et al. | 705/59 |
| 2002/0107806 A1 * | 8/2002 | Higashi et al. | 705/51 |
| 2006/0080535 A1 * | 4/2006 | Elazar et al. | 713/176 |
| 2006/0173787 A1 * | 8/2006 | Weber et al. | 705/59 |
| 2006/0184802 A1 * | 8/2006 | Ibrahim et al. | 713/189 |
| 2006/0230458 A1 * | 10/2006 | Saeki et al. | 726/26 |
| 2008/0098418 A1 * | 4/2008 | Dabrowa et al. | 725/25 |
| 2011/0069835 A1 * | 3/2011 | Maliszewski et al. | 380/42 |
| 2011/0161645 A1 * | 6/2011 | Zhang et al. | 713/2 |
| 2012/0060039 A1 * | 3/2012 | Leclercq | 713/189 |

OTHER PUBLICATIONS

International Search Report PCT/US12/27760 dated Jun. 6, 2012.

* cited by examiner

*Primary Examiner* — Taghi Arani
*Assistant Examiner* — Mohammad L Rahman
(74) *Attorney, Agent, or Firm* — Patterson & Sheridan, LLP

(57) ABSTRACT

One embodiment of the present invention sets forth a technique for decrypting digital content in a secure environment. The technique includes the steps of receiving a digital rights management (DRM) license associated with a first frame of encrypted data from a DRM server, where the DRM license includes a decryption key for decrypting the first frame of encrypted data, transmitting the DRM license to a secure content playback pipeline for storage, and transmitting the first frame of encrypted data to the secure content playback pipeline for decryption, where, in response to receiving the first frame of encrypted data, a trusted processing entity within the secure content playback pipeline decrypts the first frame of encrypted data based on the decryption key included in the DRM license to generate a first set of decrypted data and store the first set of decrypted data in a secure memory space.

20 Claims, 3 Drawing Sheets

CONTENT PLAYBACK APIS USING ENCRYPTED STREAMS

BACKGROUND OF THE INVENTION

1. Field of the Invention

Embodiments of the present invention relate generally to digital media and, more specifically, to content playback APIs using encrypted streams.

2. Description of the Related Art

Digital content distribution systems conventionally include a content server, a content player, and a communications network connecting the content server to the content player. The content server is configured to store digital content files, which can be downloaded from the content server to the content player. Each digital content file corresponds to a specific identifying title, such as "Gone with the Wind," which is familiar to a user. The digital content file typically includes sequential content data, organized according to playback chronology, and may comprise audio data, video data, or a combination thereof.

The content player is configured to download and play a digital content file, in response to a user request selecting the title for playback. The process of playing the digital content file includes decoding and rendering audio and video data into an audio signal and a video signal, which may drive a display system having a speaker subsystem and a video subsystem. Playback typically involves a technique known in the art as "streaming," whereby the content server sequentially transmits the digital content file to the content player, and the content player plays the digital content file while content data is received that comprises the digital content file.

Content data is typically encrypted and needs to be decrypted before the data can be played. The playback process, therefore, includes four steps, (i) retrieve content, (ii) decrypt content, (iii) decode content and (iv) output content. For the purposes of content protection, the content is most vulnerable and step (ii). At this step, the decrypted (and, therefore, unprotected) but still compressed content data is available. Since it is not always desirable or possible to prevent execution of un-trusted code, the decrypted content at step (ii) is vulnerable to attacks from third-party applications.

As the foregoing illustrates, what is needed in the art is an approach for decrypting digital data in a secure environment.

SUMMARY OF THE INVENTION

One embodiment of the present invention sets forth a method for decrypting digital data within a secure execution environment. The method comprises the steps of receiving a digital rights management (DRM) license associated with a first frame of encrypted data from a DRM server, where the DRM license includes a decryption key for decrypting the first frame of encrypted data, transmitting the DRM license to a secure content playback pipeline for storage, and transmitting the first frame of encrypted data to the secure content playback pipeline for decryption, where, in response to receiving the first frame of encrypted data, a trusted processing entity within the secure content playback pipeline decrypts the first frame of encrypted data based on the decryption key included in the DRM license to generate a first set of decrypted data and store the first set of decrypted data in a secure memory space.

One advantage of the disclosed technique is that the encrypted digital content is decrypted in a secure environment of the trusted execution environment and, therefore, is less vulnerable to attacks from a malicious third-party application executing on the CPU.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
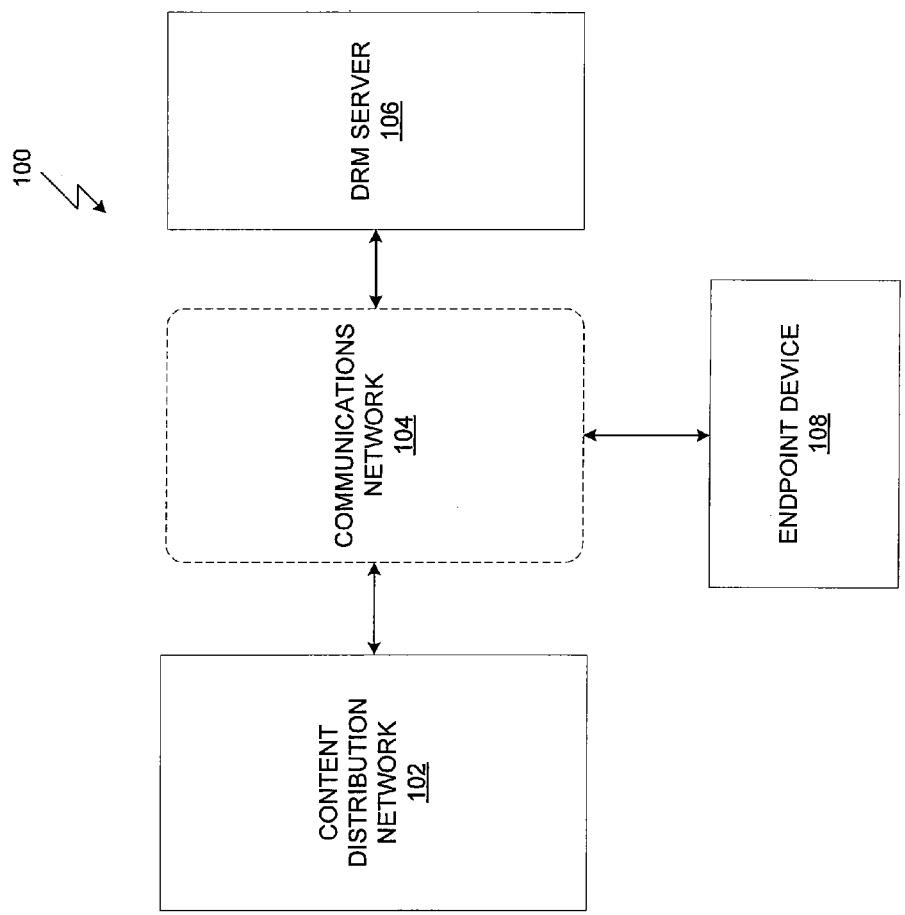
FIG. 1 illustrates a content distribution system configured to implement one or more aspects of the present invention.

FIG. 1 illustrates a content distribution system 100 configured to implement one or more aspects of the invention. As shown, the content distribution system 100 includes a content distribution network (CDN) 102, a communications network 104, a digital rights management (DRM) server 106 and an endpoint device 108.

The communications network 104 includes a plurality of network communications systems, such as routers and switches, configured to facilitate data communication between the CDN 102, the DRM server and the endpoint device 108. Persons skilled in the art will recognize that many technically feasible techniques exist for building the communications network 104, including technologies practiced in deploying the well-known internet communications network.

The endpoint device 108 may comprise a computer system, a set top box, a mobile device such as a mobile phone, or any other technically feasible computing platform that has network connectivity and is coupled to or includes a display device and speaker device for presenting video frames, and generating acoustic output, respectively.

The CDN 102 comprises one or more computer systems configured to serve download requests for digital content files received from the endpoint device 108. The digital content files may reside on a mass storage system accessible to the computer system. The mass storage system may include, without limitation, direct attached storage, network attached file storage, or network attached block-level storage. The digital content files may be formatted and stored on the mass storage system using any technically feasible technique. A data transfer protocol, such as the well-known hyper-text transfer protocol (HTTP), may be used to download digital content files from the CDN 102 to the endpoint device 108.

Figure 2:
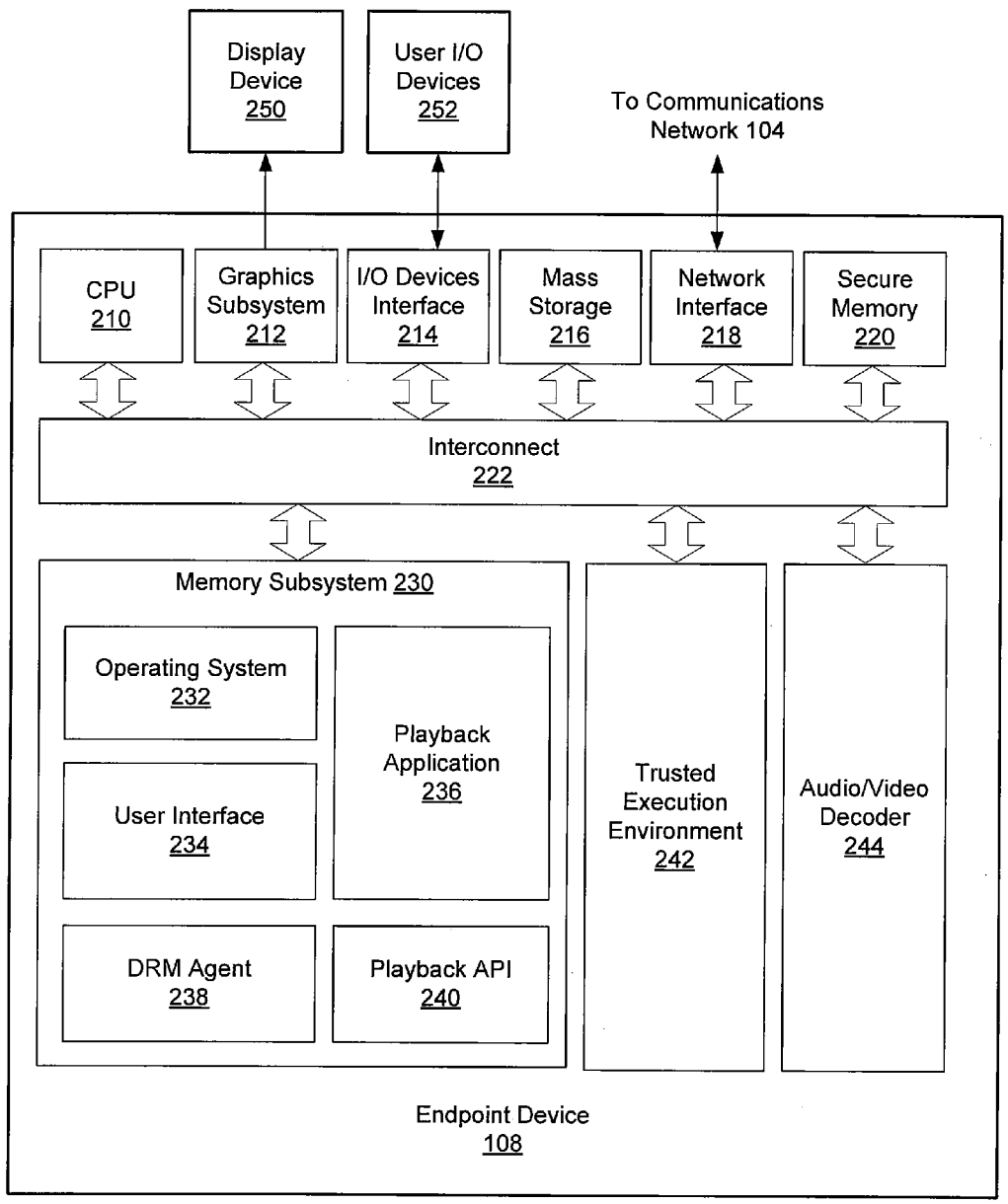
FIG. 2 is a more detailed view of the endpoint device of FIG. 1, according to one embodiment of the invention.
Figure 3:
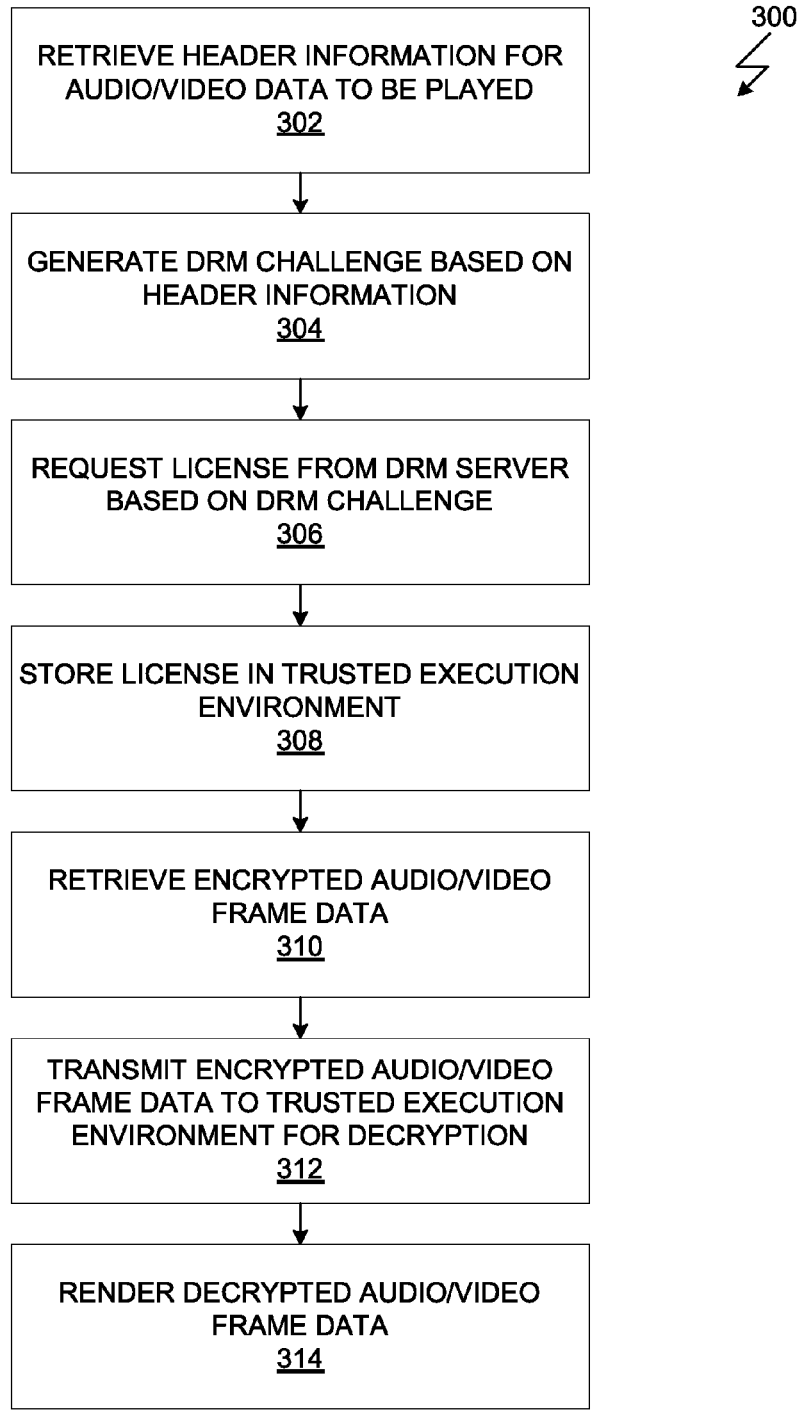
FIG. 3 is a flow diagram of method steps for decrypting and rendering encrypted audio/video content, according to one embodiment of the invention.

The DRM server 106 serves requests for licenses associated with encrypted digital content files received from the endpoint device 108. In operation, an encrypted digital content file downloaded from the CDN 102 by the endpoint device 108 must be decrypted before the digital content file can be played. The license associated with the encrypted digital content file is stored in the DRM server 106 and is transmitted to the endpoint device 108, which in turn uses the license to decrypt the digital content file. FIGS. 2 and 3 describe in detail a technique for securely decrypting encrypted digital content files.

Although, in the above description, the content distribution system 100 is shown with one endpoint device 108 and one CDN 102, persons skilled in the art will recognize that the architecture of FIG. 1 contemplates only an exemplary embodiment of the invention. Other embodiments may include any number of endpoint devices 108 and/or CDNs 102. Thus, FIG. 1 is in no way intended to limit the scope of the present invention in any way.

FIG. 2 is a more detailed view of the endpoint device 108 of FIG. 1, according to one embodiment of the invention. As shown, the endpoint device 108 includes, without limitation, a central processing unit (CPU) 210, a graphics subsystem 212, an input/output (I/O) device interface 214, a network interface 218, a secure memory space 220, an interconnect 222, a memory subsystem 230, a trusted execution environment (TEE) 242 and an audio/video decoder 244. The endpoint device 108 may also include a mass storage unit 216.

The CPU 210 is configured to retrieve and execute programming instructions stored in the memory subsystem 230. Similarly, the CPU 210 is configured to store and retrieve application data residing in the memory subsystem 230. The interconnect 222 is configured to facilitate transmission of data, such as programming instructions and application data, between the CPU 210, graphics subsystem 212, I/O devices interface 214, mass storage 216, network interface 218, secure memory space 220 and memory subsystem 230.

The graphics subsystem 212 is configured to generate frames of video data and transmit the frames of video data to display device 250. In one embodiment, the graphics subsystem 212 may be integrated into an integrated circuit, along with the CPU 210. The display device 250 may comprise any technically feasible means for generating an image for display. For example, the display device 250 may be fabricated using liquid crystal display (LCD) technology, cathode-ray technology, and light-emitting diode (LED) display technology (either organic or inorganic). An input/output (I/O) device interface 214 is configured to receive input data from user I/O devices 252 and transmit the input data to the CPU 210 via the interconnect 222. For example, user I/O devices 252 may comprise one of more buttons, a keyboard, and a mouse or other pointing device. The I/O device interface 214 also includes an audio output unit configured to generate an electrical audio output signal. User I/O devices 252 includes a speaker configured to generate an acoustic output in response to the electrical audio output signal. In alternative embodiments, the display device 250 may include the speaker. A television is an example of a device known in the art that can display video frames and generate an acoustic output. A mass storage unit 216, such as a hard disk drive or flash memory storage drive, is configured to store non-volatile data. A network interface 218 is configured to transmit and receive packets of data via the communications network 120. In one embodiment, the network interface 218 is configured to communicate using the well-known Ethernet standard. The network interface 218 is coupled to the CPU 210 via the interconnect 222.

The memory subsystem 230 includes programming instructions and data that comprise an operating system 232, a user interface 234, a playback application 236, a digital rights management (DRM) agent 238 and a playback application programming interface (API) 240. The operating system 232 performs system management functions such as managing hardware devices including the network interface 218, mass storage unit 216, I/O device interface 214, and graphics subsystem 212. The operating system 232 also provides process and memory management models for the user interface 234 and the playback application 236. The user interface 234 provides a specific structure, such as a window and object metaphor, for user interaction with endpoint device 108. Persons skilled in the art will recognize the various operating systems and user interfaces that are well-known in the art and suitable for incorporation into the endpoint device 108.

The playback application 236 is configured to retrieve encrypted digital content from the CDN 102 via the network interface 218. In addition, the playback application 236 is configured to interact with the DRM agent 238 via the playback API 240 so that the retrieved digital content is decrypted and rendered. In operation, the playback application 236 first retrieves the header information associated with a digital content file to be played from the CDN 102. The playback application 236 then transmits a request for a DRM challenge that includes the header information to the DRM agent 238 via the playback API 240. In response to the request, the DRM agent 238 generates a DRM challenge that is encrypted by an encryption/decryption module executing in the TEE 242. The DRM agent 238 then transmits the DRM challenge to the playback application 236.

Once the playback application 236 receives the DRM challenge, a request for a DRM license that includes the DRM challenge is transmitted to the DRM server 106. As previously described herein, the DRM server 106, upon receiving the DRM challenge, transmits a DRM license associated with the digital content file to be played to the playback application 236. The DRM license includes the decryption key needed to decrypt the encrypted digital content file. Upon receipt, the playback application 236 transmits the DRM license to the DRM agent 238 via the playback API 240 for storage in the TEE 242. In another embodiment, the TEE 242 only stores the decryption key included in the DRM license. In addition, the playback application 236 transmits a request for a decryption context generated based on the DRM license to the DRM agent 238 via the playback API 240. Any subsequent decryption and rendering operations are performed using the decryption context generated by the DRM agent 238.

Again, the playback application 236 is configured to retrieve encrypted digital content from the CDN 102 via the network interface 218. Once the encrypted digital content is retrieved from the CDN 102 and the decryption context is received from the DRM agent 238, the playback application 236 transmits the encrypted digital content along with the decryption context to the DRM agent 238 for decryption and rendering. The DRM agent 238, in turn, transmits the encrypted digital content and the decryption context to the TEE 242. The TEE 242 decrypts the encrypted digital content using decryption algorithms within the TEE 242. Importantly, the TEE 242 is a secure processing environment, and a third-party application executing outside the TEE 242 cannot access the decrypted digital content. The decrypted digital content is then stored in the secure memory space 220. In an alternate embodiment, the decrypted digital content is stored in a memory space that is not secure, i.e., a standard random access memory (RAM). In such an embodiment, the same decryption and rendering processes described herein still apply. In addition, a pointer to the storage location that stores the decrypted digital content is transmitted to the DRM agent 238.

The DRM agent 238, in response to receiving the pointer to the storage location that stores the decrypted digital content, transmits a request to the audio/video decoder 244 to render the decrypted digital content. In an alternate embodiment, the TEE 242 transmits the pointer to the storage location that stores the decrypted digital content directly to the audio/video decoder 244 to render the decrypted digital content.

In the case of video data, the audio/video decoder 244 reads units of video data from the secure memory space 220, and renders the units of video data into a sequence of video frames corresponding in duration to the fixed span of playback time. The sequence of video frames is processed by graphics subsystem 212 and transmitted to the display device 250. In the case of audio data, the audio/video decoder 244 reads units of audio data from the secure memory space 220, and renders the units of audio data into a sequence of audio samples, generally synchronized in time with the sequence of video frames. In one embodiment, the sequence of audio samples is transmitted to the I/O device interface 214, which converts the sequence of audio samples into the electrical audio signal. The electrical audio signal is transmitted to the speaker within the user I/O devices 252, which, in response, generates an acoustic output.

It should be noted that any combination of encrypted/unencrypted audio/video data can be processed by the system described herein. In some cases, both audio and video data are encrypted, while in other cases only one of the audio or video data is encrypted.

In such a manner, the encrypted digital content is decrypted in a secure environment of the TEE 242 and, therefore, is less vulnerable to attacks from a malicious third-party application executing on the CPU 210.

FIG. 3 is a flow diagram of method steps for decrypting and rendering encrypted audio/video content, according to one embodiment of the invention. Although the method steps are described in conjunction with the systems for FIGS. 1-2, persons skilled in the art will understand that any system configured to perform the method steps, in any order, is within the scope of the invention.

The method 300 begins at step 302, where the playback application 236 retrieves header information associated with a digital content file (audio/video data) to be played from the CDN 102. The playback application 236 then transmits a request for a DRM challenge that includes the header information to the DRM agent 238 via the playback API 240. At step 304, the DRM agent 238 generates a DRM challenge based on the header information that is then encrypted by an encryption/decryption module executing in the TEE 242. The DRM agent 238 then transmits the DRM challenge to the playback application 236.

At step 306, the playback application 236 transmits a request for a DRM license that includes the DRM challenge to the DRM server 106. As previously described herein, the DRM server 106, upon receiving the DRM challenge, transmits a DRM license associated with the digital content file to be played to the playback application 236. The DRM license includes the decryption key needed to decrypt the encrypted digital content file. At step 308, the playback application 236 transmits the DRM license to the DRM agent 238 via the playback API 240 for storage in the TEE 242.

At step 310, the playback application 236 retrieves the encrypted digital content from the CDN 102 via the network interface 218. At step 312, the playback application 236 transmits the encrypted digital content to the DRM agent 238 for decryption and rendering. The DRM agent 238, in turn, transmits the encrypted digital content to the TEE 242, and the TEE 242 decrypts the encrypted digital content. The decrypted digital content is then stored in the secure memory space 220. In addition, a pointer to the storage location that stores the decrypted digital content is transmitted to the DRM agent 238.

At step 314, the DRM agent 238, in response to receiving the pointer to the storage location that stores the decrypted digital content, transmits a request to the audio/video decoder 244 to render the decrypted digital content.

One advantage of the disclosed technique is that the encrypted digital content is decrypted in a secure environment of the TEE 242 and, therefore, is less vulnerable to attacks from a malicious third-party application executing on the CPU 210.

One embodiment of the invention may be implemented as a program product stored on computer-readable storage media within the endpoint device 108. In this embodiment, the endpoint device 108 comprising an embedded computer platform such as a set top box. An alternative embodiment of the invention may be implemented as a program product that is downloaded to a memory within a computer system, for example as executable instructions embedded within an internet web site. In this embodiment, the endpoint device 108 comprises the computer system.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A computer-implemented method for decrypting digital data within a secure execution environment, the method comprising:

transmitting a request to a digital rights management (DRM) server that includes an encrypted DRM challenge associated with a first frame of encrypted video data;

receiving a DRM license associated with the first frame of encrypted video data from the DRM server, wherein the DRM license includes a decryption key for decrypting the first frame of encrypted video data;

generating a decryption context in a secure content playback pipeline based on the DRM license, wherein the generated decryption context is different from the DRM license and includes the decryption key;

transmitting the DRM license to the secure content playback pipeline for storage;
receiving the first frame of encrypted video data and a second frame of encrypted video data from a content distribution server; and
transmitting the first and second frames of encrypted video data and the decryption context to the secure content playback pipeline for decryption, wherein, in response to receiving the first and second frames of encrypted video data, a trusted processing entity within the secure content playback pipeline decrypts the first and second frames of encrypted video data based on the decryption key included in the DRM license to generate a first set and a second set of decrypted video data and store the sets of decrypted video data in a secure memory space, wherein the sets of decrypted video data stored in the secured memory space cannot be accessed by a third-party application executing outside the trusted processing entity.

2. The method of claim 1, wherein the encrypted DRM challenge is generated by the secure content playback pipeline, and wherein the DRM license is received from the DRM server in response to the request.

3. The method of claim 2, wherein the first frame of encrypted video data is encoded for a particular playback rate.

4. The method of claim 3, further comprising decoding the first set of decrypted data stored in the secure memory to generate decoded video data, and transmitting the decoded video data to an output device for playback.

5. The method of claim 4, wherein the third-party application is executed on a computing system executing the trusted processing entity.

6. The method of claim 5, further comprising transmitting a request to the content distribution server for the first and second frames of encrypted video data, and receiving the first and second frames of encrypted data from the content distribution server.

7. The method of claim 6, wherein the secure content playback pipeline includes a DRM agent that generates the decryption context in response to receiving the DRM license.

8. A non-transitory computer readable storage medium storing instructions that, when executed by a processor, cause the processor to decrypt digital data within a secure execution environment, by performing the steps of:
transmitting a request to a digital rights management (DRM) server that includes an encrypted DRM challenge associated with a first frame of encrypted video data;
receiving a DRM license associated with the first frame of encrypted video data from the DRM server, wherein the DRM license includes a decryption key for decrypting the first frame of encrypted video data;
generating a decryption context in a secure content playback pipeline based on the DRM license, wherein the generated decryption context is different from the DRM license and includes the decryption key;
transmitting the DRM license to the secure content playback pipeline for storage;
receiving the first frame of encrypted video data and a second frame of encrypted video data from a content distribution server; and
transmitting the first and second frames of encrypted video data and the decryption context to the secure content playback pipeline for decryption, wherein, in response to receiving the first and second frames of encrypted video data, a trusted processing entity within the secure content playback pipeline decrypts the first and second frames of encrypted video data based on the decryption key included in the DRM license to generate a first set and a second set of decrypted video data and store the sets of decrypted video data in a secure memory space, wherein the sets of decrypted video data stored in the secured memory space cannot be accessed by a third-party application executing outside the trusted processing entity.

9. The non-transitory computer readable storage medium of claim 8, wherein the encrypted DRM challenge is generated by the secure content playback pipeline, and wherein the DRM license is received from the DRM server in response to the request.

10. The non-transitory computer readable storage medium of claim 9, wherein the first frame of encrypted video data is encoded for a particular playback rate.

11. The non-transitory computer readable storage medium of claim 10, further comprising decoding the first set of decrypted data stored in the secure memory to generate decoded video data, and transmitting the decoded video data to an output device for playback.

12. The non-transitory computer readable storage medium of claim 11, wherein the third-party application is executed on a computing system executing the trusted processing entity.

13. The non-transitory computer readable storage medium of claim 12, further comprising transmitting a request to the content distribution server for the first and second frames of encrypted video data, and receiving the first and second frames of encrypted data from the content distribution server.

14. The non-transitory computer readable storage medium of claim 13, wherein the secure content playback pipeline includes a DRM agent that generates the decryption context in response to receiving the DRM license.

15. A system, comprising:
a secure content playback pipeline comprising a digital rights management (DRM) agent and a trusted processing entity; and
a processor executing a playback application configured to:
transmit a request to a digital rights management (DRM) server that includes an encrypted DRM challenge associated with a first frame of encrypted video data;
receive a DRM license associated with the first frame of encrypted video data from the DRM server, wherein the DRM license includes a decryption key for decrypting the first frame of encrypted video data;
generate a decryption context in the secure content playback pipeline based on the DRM license, wherein the generated decryption context is different from the DRM license and includes the decryption key;
transmit the DRM license to the secure content playback pipeline for storage;
receive the first frame of encrypted video data and a second frame of encrypted video data from a content distribution server; and
the first and second frames of encrypted video data and the decryption context to the secure content playback pipeline for decryption, wherein, in response to receiving the first and second frames of encrypted video data, a trusted processing entity within the secure content playback pipeline decrypts the first and second frames of encrypted video data based on the decryption key included in the DRM license to generate a first set and a second set of decrypted video data and store the sets of decrypted video data in a secure memory space, wherein the sets of decrypted video data stored in the secured memory space cannot be accessed by a third-party application executing outside the trusted processing entity.

16. The system of claim 15, wherein the third-party application is executed on a computing system executing the trusted processing entity.

17. The system of claim 16, wherein the encrypted DRM challenge is generated by the secure content playback pipeline, and wherein the DRM license is received from the DRM server in response to the request, wherein the first frame of encrypted video data is encoded for a particular playback rate.

18. The system of claim 17, wherein the playback application is further configured to decode the first set of decrypted data stored in the secure memory to generate decoded video data, and transmit the decoded video data to an output device for playback.

19. The system of claim 18, wherein the third-party application is executed on a computing system executing the trusted processing entity, wherein the secure content playback pipeline includes a DRM agent that generates the decryption context in response to receiving the DRM license.

20. The system of claim 19, wherein the playback application is further configured to transmit a request to the content distribution server for the first and second frames of encrypted video data, and receive the first and second frames of encrypted data from the content distribution server.

* * * * *